Dec. 16, 1924. 1,519,176
F. O. TROGER ET AL
TOASTER
Filed Jan. 22, 1923  2 Sheets-Sheet 1
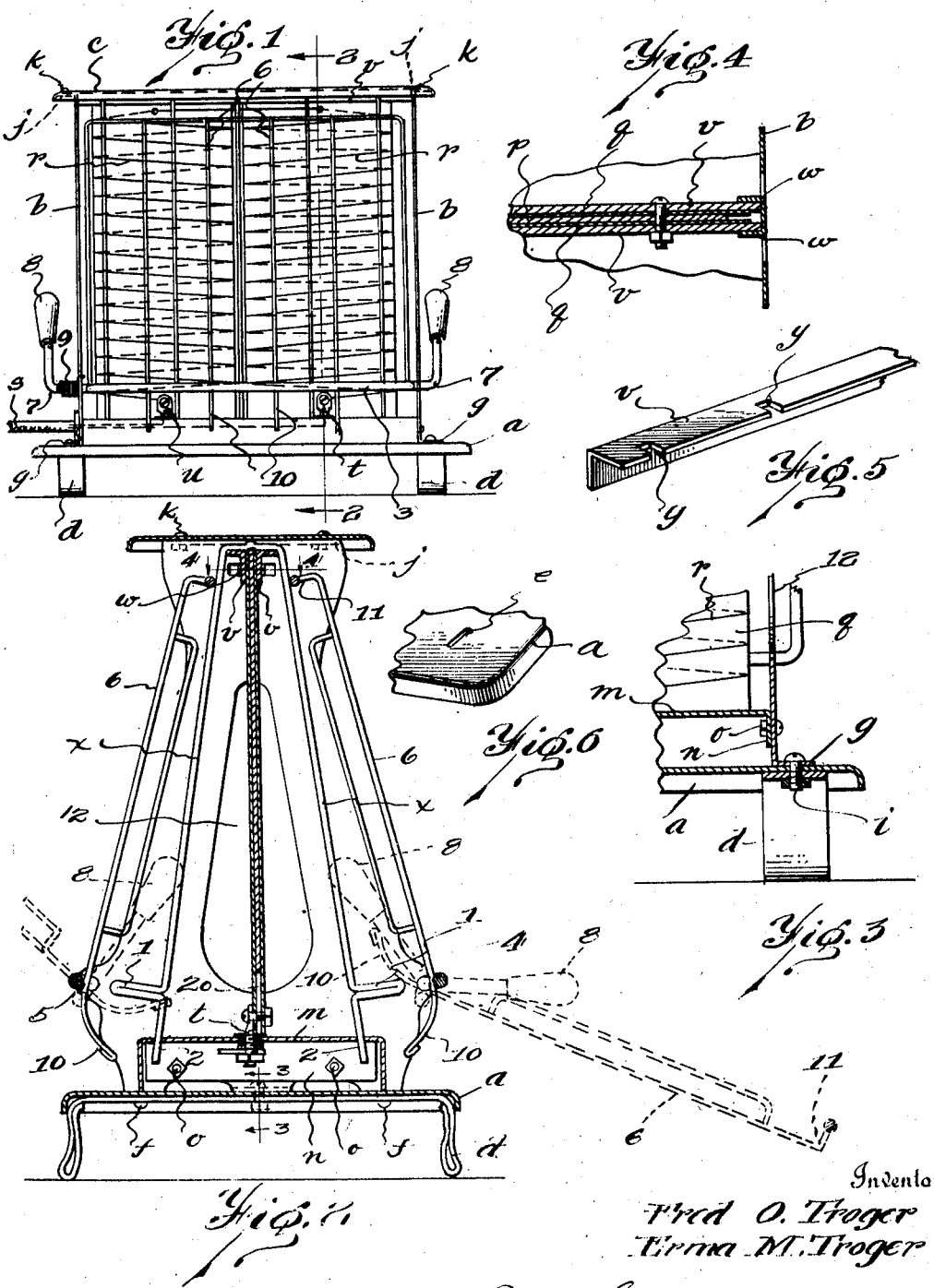
Inventors
Fred O. Troger
Irma M. Troger
By Stuart C. Barnes
Attorney

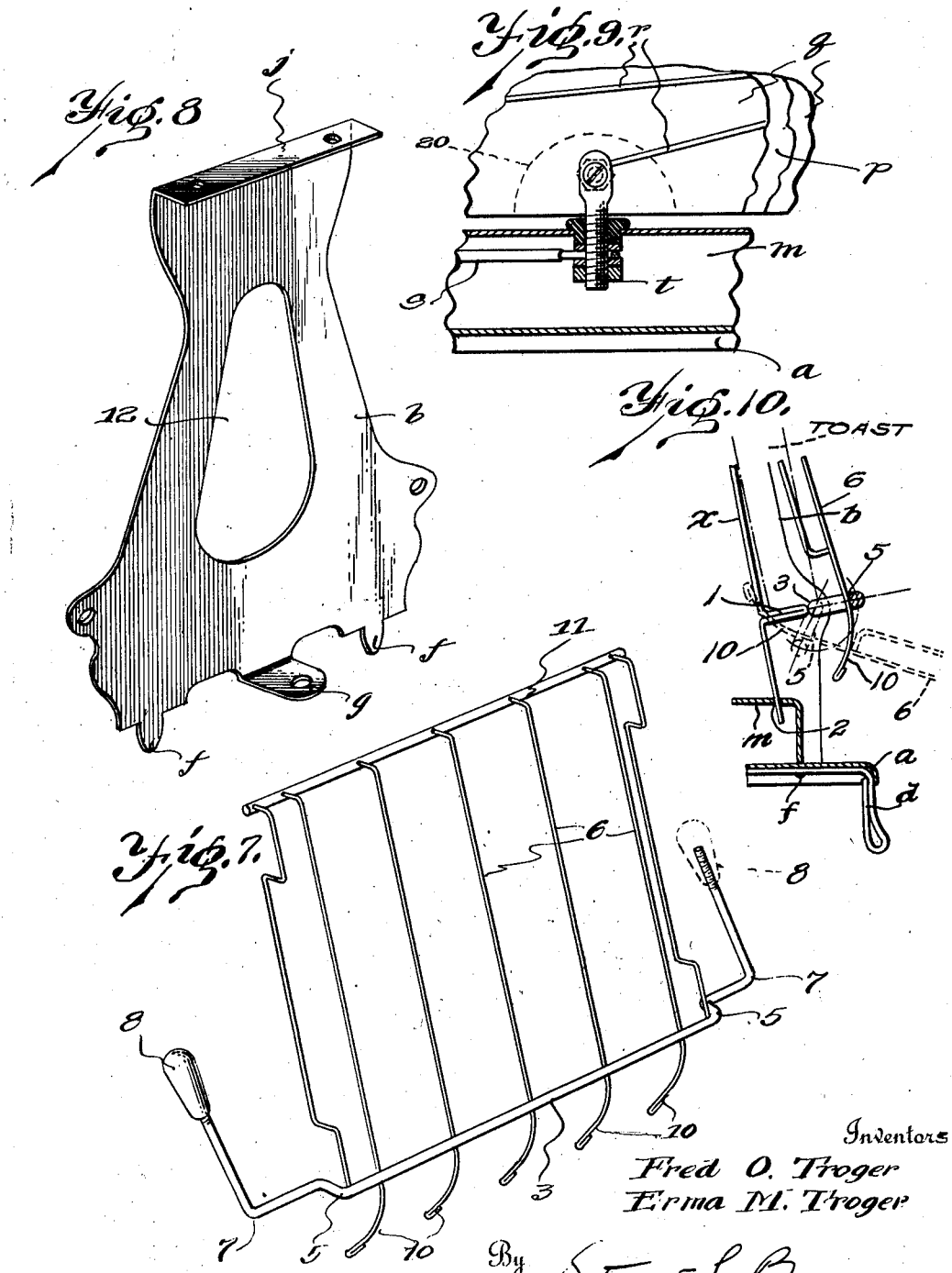

Patented Dec. 16, 1924.

1,519,176

UNITED STATES PATENT OFFICE.

FRED O. TROGER AND ERMA M. TROGER, OF DETROIT, MICHIGAN, ASSIGNORS TO THOMAS EDISON JACKSON, OF DETROIT, MICHIGAN.

TOASTER.

Application filed January 22, 1923. Serial No. 614,137.

*To all whom it may concern:*

Be it known that FRED O. TROGER and ERMA M. TROGER, citizens of the United States, residing at Detroit, in the county of Wayne and State of Michigan, have invented certain new and useful Improvements in Toasters, of which the following is a specification.

This invention relates to a toaster and more particularly to a turn-over toaster, i. e., one that will turn over the bread so that both sides of the bread may be toasted without having to handle the toast.

The object of this invention is to provide a cheap turn-over toaster that is easily and positively operated. Another object is to provide a structure that can be very quickly and easily assembled in view of the fact that it is desired to keep the production cost as low as possible. Furthermore, this toaster is entirely formed of stampings and the parts can be quickly made by suitable machinery.

In the drawings:

Fig. 1 is a front elevation of the toaster.

Fig. 2 is a section on the line 2—2 of Fig. 1.

Fig. 3 is a section on the line 3—3 of Fig. 2.

Fig. 4 is a section on the line 4—4 of Fig. 2.

Fig. 5 is a detail in perspective of one of the angle bars for supporting the upper portion of the heating element and the guard wires.

Fig. 6 is a detail in perspective of one corner of the base supporting plate showing the slots for supporting the end plates.

Fig. 7 is a view in perspective of the turn-over grid.

Fig. 8 is a view in perspective of one of the end plates.

Fig. 9 is a detail of the means for securing the lower edge of the heating element to the support.

Fig. 10 is an enlarged detail showing the action of the offset crank shaft in pushing the toast off its support.

The toaster comprises a base plate $a$, the end plates $b$, the top plate $c$, and legs $d$. The base plate is provided with a pair of slots $e$ at each end. The end plates are provided with a pair of projecting ears $f$ which are adapted to engage in these slots, and the end plates are each provided with a laterally projecting ear $g$, adapted to rest on the plate $a$. The leg member $d$, the base plate $a$, and the ear $g$ are secured together by means of a bolt and nut $i$. This provides a very convenient way for assembling the parts together quickly by means of a single bolt for each end plate. The top portion of each end plate is flanged over as at $j$ and the top plate is secured to this flanged portion by means of nuts and bolts $k$.

Interposed between the two end plates immediately above the base plate $a$, is a housing or plate $m$, which has down turned flanged ends $n$, these flanged ends being bolted to the end plates as at $o$. This conceals the electrical connections from the outside.

There are two heating element supports each comprising an upright sheet iron support $p$, mica sheets $q$ disposed on both sides of the sheet iron support, and the resistance wire $r$ is wound around the outside of the mica sheets as shown in Fig. 1. The current is led through a cord $s$ to a binding post $t$ on one of the heating element supports, the sheet iron member being cut away as at 20 so as to prevent a possibility of the binding post coming in contact with the sheet iron. The resistance wire is attached to this binding post wound upwardly around the heating element support and crossed over to the other heating element support near the top and wound downwardly around the last mentioned heating element support and connected to the binding post $u$, which is connected to the cord $s$.

The binding posts support the heating elements at the lower edge and at the upper edge they are interposed between a pair of angle bars $v$ and bolts are passed through said angle bars and heating elements to bind them together. The end plates are provided with punched out lugs $w$ as shown in Fig. 4 which straddle the said angle bars and hold them from side-wise movement.

The guard wires $x$ each of one continuous piece are shaped like an inverted U and are hung over said angle bars $v$ the said angle bars being provided with a plurality of notches $y$ for positively holding the said guard wires in place. Near the lower end of said guard wires are provided bent out projecting portions 1 which are adapted to support the toast and the extreme lower ends are inserted into the box-like housing $m$ as at 2, as shown in Fig. 2.

The turn over grid is provided with a shaft 3, which is pivotally supported in ears 4 carried by the end plates b. The central portion of this shaft is off-set as at 5 and welded to this portion are the vertical grid wires 6. The shaft is bent as at 7 and handles 8 are secured on the ends thereof so that the shaft may be rotated by hand to lower the grid into the dotted line position as shown in Fig. 2. A coiled spring 9 having one end secured to the end plate and the other end secured to the shaft is placed under tortional strain upon the lowering of the grid so that when the grid is released it will be returned automatically to its initial position. The grids are provided each with the curved projecting fingers 10 which project below the supported shaft 3. The said fingers are curved inwardly and preferably constructed as shown in Fig. 2 as being a continuation of the vertical grid members.

In operating the turn-over, the handles will be pulled outwardly by hand, causing the shaft to be rotated, the off-set portion of the shaft causing the same to dip downwardly and inwardly, whereby the fingers are caused to dip in and under the lower edge of the toast and on further movement of the handles these fingers propel the lower portion of the slice of toast outwardly, moving the same off from the supports 1 carried by the guard wires. This will allow the toast to slide down upon the turn-over grid, against the stop portion 11 carried by the end of the turn-over grid. When the handles are released the spring causes the grid to return to its initial position carrying with it the toast which is thrown against the guard wires presenting the other side of the toast to the heating element.

It is evident from the foregoing description that we have provided a turn-over device that positively causes the toast to turn over as the fingers dip under the edge of the toast and positively propel it outwardly off of its support allowing the toast to freely slide down upon the turn-over grid.

The end plates are provided with a cut away portion 12 (see Fig. 2) which enables one to see the side of the bread that is being toasted so the bread can be turned over when the same is properly toasted.

We are aware that it is not broadly new to provide a grid with fingers that engage the bottom of the toast to kick it out and cause it to slide down the grid reversed.

Referring to Fig. 10 the action of the fingers in pushing the toast off its support is clearly obvious. Due to the fact that the fingers are secured to the offset portion of the crank shaft they are caused to describe a path as illustrated in the dotted line position of Fig. 10. It will obviously be seen that the action in pushing the toast off the support is delayed until the grid nears the limit of its downward movement. As the toast is pushed off the support it readily falls on to the downwardly inclined grid and slides down the grid very easily.

What we claim is:

1. An electric toaster including a grid provided with an outwardly offset crank shaft, said shaft pivotally mounted on the toaster, and downwardly extending fingers carried by the off-set portion of said crank shaft and constructed to dip under and behind a slice of toast on rotation of the crank shaft for the purpose of turning the toast so as to present the other side to the toaster when the turn-over grid is returned to its initial position.

2. An electric toaster including a grid provided with an outwardly offset crank shaft, said shaft pivotally mounted on the toaster at each end, the offset portion of the crank shaft located between the ends of the crank shaft where the same is pivotally supported by the toaster, and a plurality of inwardly curved fingers secured to said offset portion whereby the rotation of the shaft causes the fingers to dip under and behind a slice of toast supported adjacent the toaster.

In testimony whereof we affix our signatures.

FRED O. TROGER.
ERMA M. TROGER.